(12) United States Patent
Ferguson et al.

(10) Patent No.: US 11,620,694 B2
(45) Date of Patent: *Apr. 4, 2023

(54) SYSTEMS AND METHODS FOR UNMANNED POSITIONING AND DELIVERY OF RENTAL VEHICLES

(71) Applicant: Nuro, Inc., Mountain View, CA (US)

(72) Inventors: David Ferguson, San Francisco, CA (US); Jiajun Zhu, Palo Alto, CA (US); Cosimo Leipold, Washington, DC (US)

(73) Assignee: Nuro, Inc., Mountain View, CA (US)

( * ) Notice: Subject to any disclaimer, the term of this patent is extended or adjusted under 35 U.S.C. 154(b) by 264 days.

This patent is subject to a terminal disclaimer.

(21) Appl. No.: 17/077,584

(22) Filed: Oct. 22, 2020

(65) Prior Publication Data

US 2021/0039585 A1 Feb. 11, 2021

Related U.S. Application Data

(63) Continuation of application No. 16/047,659, filed on Jul. 27, 2018, now Pat. No. 10,860,015.
(Continued)

(51) Int. Cl.
*G01C 21/34* (2006.01)
*G06Q 30/0601* (2023.01)
(Continued)

(52) U.S. Cl.
CPC ............ *G06Q 30/0631* (2013.01); *A23L 2/52* (2013.01); *A23L 5/00* (2016.08); *A23L 7/109* (2016.08); *A47J 37/0658* (2013.01); *A47J 47/00* (2013.01); *B60H 1/00364* (2013.01); *B60H 1/00735* (2013.01); *B60P 1/36* (2013.01);
(Continued)

(58) Field of Classification Search
CPC ...... G06Q 30/0631; G08G 1/22; G08G 1/202; G05D 1/0027; G05D 1/0033; G05D 1/0038; G05D 1/0061; G05D 1/0088; G05D 1/0094; G05D 1/0212; G05D 1/0214; G05D 1/0223; G05D 1/0231; G05D 1/0276; G05D 1/0291; G05D 1/12; G01C 21/20
See application file for complete search history.

(56) References Cited

U.S. PATENT DOCUMENTS 6,411,202 B1 6/2002 Gal et al.
9,599,477 B1 3/2017 Aula et al.
(Continued)

OTHER PUBLICATIONS

International Search Report and Written Opinion dated Oct. 10, 2018 in corresponding International Application No. PCT/US2018/044361.

*Primary Examiner* — Calvin Cheung

(57) ABSTRACT

A managing apparatus for positioning rental vehicles includes a memory storing instructions and a processor configured to execute the instructions to cause the managing apparatus to access model information and location information for a plurality of autonomous vehicles, receive a request including a delivery location and a chosen model for renting, select an autonomous vehicle of the chosen model from among the plurality of autonomous vehicles based on the model information, the location information, and the delivery location, instruct the selected autonomous vehicle to fully-autonomously or semi-autonomously travel to the delivery location, and instruct the selected autonomous vehicle to switch to manual operation mode at the delivery location for manual operation by a vehicle rental customer.

20 Claims, 7 Drawing Sheets

Related U.S. Application Data

(60) Provisional application No. 62/538,538, filed on Jul. 28, 2017.

(51) Int. Cl.

| | |
|---|---|
| G08G 1/04 | (2006.01) |
| B60P 3/00 | (2006.01) |
| B60R 21/34 | (2011.01) |
| B65G 67/24 | (2006.01) |
| G05D 1/00 | (2006.01) |
| G05D 1/02 | (2020.01) |
| G05D 1/12 | (2006.01) |
| G06K 7/10 | (2006.01) |
| G06Q 10/0631 | (2023.01) |
| G06Q 10/083 | (2023.01) |
| G06Q 50/12 | (2012.01) |
| G06Q 50/28 | (2012.01) |
| G08G 1/00 | (2006.01) |
| H04L 67/12 | (2022.01) |
| G06Q 10/08 | (2023.01) |
| G06N 20/00 | (2019.01) |
| B60R 25/25 | (2013.01) |
| A23L 5/00 | (2016.01) |
| A23L 7/109 | (2016.01) |
| G06F 16/955 | (2019.01) |
| A23L 2/52 | (2006.01) |
| A47J 37/06 | (2006.01) |
| A47J 47/00 | (2006.01) |
| B60H 1/00 | (2006.01) |
| B60P 1/36 | (2006.01) |
| B60P 3/025 | (2006.01) |
| B60R 19/18 | (2006.01) |
| G06K 7/14 | (2006.01) |
| G06K 19/06 | (2006.01) |
| G06Q 10/0635 | (2023.01) |
| G06Q 10/0832 | (2023.01) |
| G06Q 10/0833 | (2023.01) |
| G06Q 10/0834 | (2023.01) |
| G06Q 10/0835 | (2023.01) |
| G06Q 10/0837 | (2023.01) |
| G06Q 20/00 | (2012.01) |
| G06Q 20/12 | (2012.01) |
| G06Q 20/18 | (2012.01) |
| G06Q 30/0645 | (2023.01) |
| G07F 17/00 | (2006.01) |
| G07F 17/12 | (2006.01) |
| G07C 5/02 | (2006.01) |
| G07C 5/08 | (2006.01) |
| G06V 20/56 | (2022.01) |
| G06V 20/64 | (2022.01) |
| G06Q 30/0251 | (2023.01) |
| G06Q 50/30 | (2012.01) |
| G06K 19/07 | (2006.01) |
| H04W 4/024 | (2018.01) |
| H04W 4/40 | (2018.01) |
| G01C 21/20 | (2006.01) |
| B60R 19/48 | (2006.01) |
| G06F 3/0484 | (2022.01) |
| B60R 21/36 | (2011.01) |
| H04N 5/76 | (2006.01) |
| H05B 6/68 | (2006.01) |

(52) U.S. Cl.
CPC ............ *B60P 3/007* (2013.01); *B60P 3/0257* (2013.01); *B60R 19/18* (2013.01); *B60R 19/483* (2013.01); *B60R 21/34* (2013.01); *B60R 25/25* (2013.01); *B60R 25/252* (2013.01); *B65G 67/24* (2013.01); *G01C 21/20* (2013.01); *G01C 21/343* (2013.01); *G01C 21/3438* (2013.01); *G01C 21/3453* (2013.01); *G05D 1/0027* (2013.01); *G05D 1/0033* (2013.01); *G05D 1/0038* (2013.01); *G05D 1/0061* (2013.01); *G05D 1/0088* (2013.01); *G05D 1/0094* (2013.01); *G05D 1/0212* (2013.01); *G05D 1/0214* (2013.01); *G05D 1/0223* (2013.01); *G05D 1/0231* (2013.01); *G05D 1/0276* (2013.01); *G05D 1/0291* (2013.01); *G05D 1/12* (2013.01); *G06F 16/955* (2019.01); *G06K 7/10297* (2013.01); *G06K 7/10722* (2013.01); *G06K 7/1413* (2013.01); *G06K 19/06028* (2013.01); *G06K 19/0723* (2013.01); *G06N 20/00* (2019.01); *G06Q 10/0631* (2013.01); *G06Q 10/0635* (2013.01); *G06Q 10/06315* (2013.01); *G06Q 10/08* (2013.01); *G06Q 10/083* (2013.01); *G06Q 10/0832* (2013.01); *G06Q 10/0833* (2013.01); *G06Q 10/0834* (2013.01); *G06Q 10/0835* (2013.01); *G06Q 10/0837* (2013.01); *G06Q 10/08355* (2013.01); *G06Q 20/00* (2013.01); *G06Q 20/127* (2013.01); *G06Q 20/18* (2013.01); *G06Q 30/0265* (2013.01); *G06Q 30/0266* (2013.01); *G06Q 30/0645* (2013.01); *G06Q 50/12* (2013.01); *G06Q 50/28* (2013.01); *G06Q 50/30* (2013.01); *G06V 20/56* (2022.01); *G06V 20/64* (2022.01); *G07C 5/02* (2013.01); *G07C 5/08* (2013.01); *G07F 17/0057* (2013.01); *G07F 17/12* (2013.01); *G08G 1/04* (2013.01); *G08G 1/202* (2013.01); *H04L 67/12* (2013.01); *H04W 4/024* (2018.02); *H04W 4/40* (2018.02); *A23V 2002/00* (2013.01); *B60R 21/36* (2013.01); *B60R 2021/346* (2013.01); *G05D 2201/0207* (2013.01); *G05D 2201/0213* (2013.01); *G06F 3/0484* (2013.01); *G08G 1/22* (2013.01); *H04N 5/76* (2013.01); *H05B 6/688* (2013.01)

(56) References Cited

U.S. PATENT DOCUMENTS

| | | |
|---|---|---|
| 2010/0084426 A1 | 4/2010 | Devers et al. |
| 2014/0081445 A1 | 3/2014 | Villamar |
| 2015/0006005 A1 | 1/2015 | Yu et al. |
| 2016/0027307 A1 | 1/2016 | Abhyanker et al. |
| 2016/0187150 A1 | 6/2016 | Sherman et al. |
| 2017/0101055 A1 | 4/2017 | Alfaro Fonseca |
| 2017/0123429 A1 | 5/2017 | Levinson et al. |
| 2017/0174343 A1 | 6/2017 | Erickson et al. |
| 2017/0213165 A1 | 7/2017 | Stauffer et al. |
| 2018/0050698 A1 | 2/2018 | Polisson et al. |
| 2018/0114076 A1 | 4/2018 | Miller et al. |
| 2018/0218470 A1 | 8/2018 | Belwafa et al. |
| 2018/0341895 A1 | 11/2018 | Kislovskiy et al. |
| 2018/0354411 A1 | 12/2018 | Shmueli Friedland et al. |

SYSTEMS AND METHODS FOR UNMANNED POSITIONING AND DELIVERY OF RENTAL VEHICLES

CROSS-REFERENCE TO RELATED APPLICATIONS

The present application is a continuation of and claims the benefit of priority to U.S. patent application Ser. No. 16/047,659, filed on Jul. 27, 2018, and issued on Dec. 8, 2020 as U.S. Pat. No. 10,860,015, which application claims priority to U.S. Provisional Application No. 62/538,538, filed on Jul. 28, 2017, both of which applications are hereby incorporated by reference in their entirety.

FIELD OF THE TECHNOLOGY

The present application relates to rental autonomous vehicles, and in particular, to management systems and methods for positioning and delivery of rental autonomous vehicles.

BACKGROUND

In case of renting a vehicle, customers have to drive or take a cab to rental vehicle facilities where rental vehicles are kept, or human operators bring rental vehicles to customers or pick up and bring customers to rental vehicle facilities. In this case, the customers have to locate where rental vehicle facilities are, find out availability of desired vehicle models, and travel to a rental facility where the desired vehicles are. These processes are time-consuming to consumers. Further, cost of having human operators bring rental vehicles to customers or picking up customers is high, resulting in higher cost in renting vehicles at these facilities that provide such a service.

Nevertheless, rental vehicles are a necessity in an increasingly mobile world in which business and leisure are conducted in distant places far away from a person's own vehicle. Accordingly, there is continuing interest in developing technologies for improving a customer's rental vehicle experience and for improving rental vehicle operations.

SUMMARY

This disclosure relates to management systems and methods for autonomously positioning and delivering rental autonomous vehicles. In one aspect, the present disclosure provides systems and methods for autonomously delivering vehicles to customers.

In accordance with aspects of the present disclosure, a managing apparatus for positioning rental vehicles includes a memory storing instructions and a processor configured to execute the instructions to cause the managing apparatus to access model information and location information for a plurality of autonomous vehicles, receive a request including a delivery location and a chosen model for renting, select an autonomous vehicle of the chosen model from among the plurality of autonomous vehicles based on the model information, the location information, and the delivery location, instruct the selected autonomous vehicle to fully-autonomously or semi-autonomously travel to the delivery location, and instruct the selected autonomous vehicle to switch to manual operation mode at the delivery location for manual operation by a vehicle rental customer.

In various embodiments, the selected autonomous vehicle includes a driver seat, manual steering mechanism, manual acceleration mechanism, and manual braking mechanism.

In various embodiments, the processor executes the instructions to further cause the managing apparatus to receive an occupied status from the selected autonomous vehicle indicating that a human driver has occupied the selected autonomous vehicle. In various embodiments, in instructing the selected autonomous vehicle to switch to manual operation mode, the processor executes the instructions to cause the managing apparatus to instruct the selected autonomous vehicle to switch to manual operation mode in response to the occupied status.

In various embodiments, the processor executes the instructions to further cause the managing apparatus to receive a rental completion indication for the selected autonomous vehicle. In various embodiments, the processor executes the instructions to further cause the managing apparatus to instruct the selected autonomous vehicle to switch to fully-autonomous or semi-autonomous navigation mode in response to the rental completion indication In various embodiments, the processor executes the instructions to further cause the managing apparatus to instruct the selected vehicle to fully-autonomously or semi-autonomously perform at least one of: find a temporary legal parking space, drive around in a local area, travel to another customer, travel to another neighborhood with higher demand, or find a charging/gas station.

In various embodiments, in selecting the autonomous vehicle, the processor executes the instructions to cause the managing apparatus to filter the plurality of autonomous vehicles by at least one of: vehicle availability, vehicle types, battery/gas levels sufficient for service durations, or vehicles' ability to travel to customers within customers' chosen time.

In various embodiments, the plurality of autonomous vehicles includes bikes and scooters.

In accordance with aspects of present disclosure, a method for positioning rental vehicles includes accessing model information and location information for a plurality of autonomous vehicles, receiving a request including a delivery location and a chosen model for renting, selecting an autonomous vehicle of the chosen model from among the plurality of autonomous vehicles based on the model information, the location information, and the delivery location, instructing the selected autonomous vehicle to fully-autonomously or semi-autonomously travel to the delivery location, and instructing the selected autonomous vehicle to switch to manual operation mode at the delivery location for manual operation by a vehicle rental customer.

In various embodiments, the selected autonomous vehicle includes a driver seat, manual steering mechanism, manual acceleration mechanism, and manual braking mechanism.

In various embodiments, the method includes receiving an occupied status from the selected autonomous vehicle indicating that a human driver has occupied the selected autonomous vehicle. In various embodiments, in the method, instructing the selected autonomous vehicle to switch to manual operation mode includes instructing the selected autonomous vehicle to switch to manual operation mode in response to the occupied status.

In various embodiments, the method includes receiving a rental completion indication for the selected autonomous vehicle. In various embodiments, the method includes instructing the selected autonomous vehicle to switch to fully-autonomous or semi-autonomous navigation mode in response to the rental completion indication.

In various embodiments, the method includes instructing the selected vehicle to fully-autonomously or semi-autonomously perform at least one of: find a temporary legal parking space, drive around in a local area, travel to another customer, travel to another neighborhood with higher demand, or find a charging/gas station.

In various embodiments, in the method, selecting the autonomous vehicle includes filtering the plurality of autonomous vehicles by at least one of: vehicle availability, vehicle types, battery/gas levels sufficient for service durations, or vehicles' ability to travel to customers within customers' chosen time.

In various embodiments, the plurality of autonomous vehicles includes bikes and scooters.

In another aspect, the present disclosure provides systems and methods for autonomously delivering vehicles to customers. If the rental vehicle is autonomous, the vehicle can be instructed to travel autonomously to the customer. If the rental vehicle is not autonomous, it can be delivered to a customer by using autonomous robot vehicles.

In accordance with aspects of the present disclosure, a managing apparatus for autonomously repositioning vehicles includes a memory storing instructions and a processor configured to execute the instructions to cause the managing apparatus to access model information and location information for a plurality of vehicles, the plurality of vehicles including at least one of autonomous vehicles or non-autonomous vehicles, receive a request including a delivery location and a chosen model for renting, select a vehicle of the chosen model among the plurality of vehicles based on the model information, the location information, and the delivery location, and communicate instructions to autonomously reposition the selected vehicle to the delivery location.

In various embodiments, in a case where the selected vehicle is autonomous, the processor executes the instructions to further cause the managing apparatus, in communicating instructions to autonomously reposition the selected vehicle, to instruct the selected vehicle to autonomously drive to the delivery location.

In various embodiments, in a case where the chosen model is non-autonomous, the processor executes the instructions to further cause the managing apparatus to determine whether the selected vehicle is secured in a parking station.

In various embodiments, when the selected vehicle is determined to be secured only in the parking station, the processor executes the instructions to further cause the managing apparatus, in communicating instructions to autonomously reposition the vehicle, to select an autonomous robot vehicle based on the location information and instruct the autonomous robot vehicle to pick up the selected vehicle from the parking station and to deliver the selected vehicle to the delivery location.

In various embodiments, the autonomous robot vehicle includes a monitoring device configured to monitor surroundings thereof.

In various embodiments, the processor executes the instructions to further cause the managing apparatus to receive the monitoring results from the autonomous robot vehicle.

In various embodiments, the processor executes the instructions to further cause the managing apparatus, in instructing the autonomous robot vehicle, to instruct the autonomous robot vehicle based on the monitoring results.

In various embodiments, in a case where the selected vehicle is non-autonomous, the processor executes the instructions to further cause the managing apparatus, in communicating instructions to autonomously reposition the vehicle, to determine that the selected vehicle is secured in an autonomous robot vehicle and instruct the autonomous robot vehicle to travel to the delivery location.

In various embodiments, the autonomous robot vehicle includes a global positioning managing apparatus tracker configured to track a location thereof.

In various embodiments, the processor executes the instructions to further cause the managing apparatus to filter rental vehicles by vehicle availability, vehicle types, battery/gas levels sufficient for service durations, vehicles' ability to travel to customers within customers' chosen time.

In various embodiments, after usage of the selected vehicle is ended, the processor executes the instructions to further cause the managing apparatus to control the selected vehicle to find a temporary, legal parking space, driving around in a local area, travel to another customer, travel to another neighborhood with higher demand, or find a charging/gas station.

In various embodiments, the selected vehicle is accessed after authentication. The authentication is verified via bio-metric information, passcode, or mobile communication.

In various embodiments, the bio-metric information includes fingerprint, iris, or face recognition.

In various embodiments, the selected vehicle is driven without a physical key upon verification of the authentication.

In various embodiments, the plurality of vehicles includes at least one of: cars, scooters, bicycles, electric bikes.

In accordance with aspects of the present disclosure, a method for controlling a managing apparatus to autonomously reposition vehicles includes accessing model information and location information for a plurality of vehicles, the plurality of vehicles including at least one of autonomous vehicles or non-autonomous vehicles, receiving a request including a delivery location and a chosen model for renting, selecting a vehicle of the chosen model among the plurality of vehicles based on the model information, the location information, and the delivery location, and communicating instructions to autonomously reposition the selected vehicle to the delivery location.

In various embodiments, in a case where the selected vehicle is autonomous, communicating instructions to autonomously reposition the selected vehicle to the delivery location includes instructing the selected vehicle to autonomously drive to the delivery location.

In various embodiments, the method further includes, in a case where the chosen model is non-autonomous, determining whether the selected vehicle is secured in a parking station.

In various embodiments, the method further includes, in a case where the selected vehicle is determined to be secured in the parking station, selecting an autonomous robot vehicle based on the location information and instructing the autonomous robot vehicle to pick up the selected vehicle from the parking station and to deliver the selected vehicle to the delivery location.

In various embodiments, the method further includes, in a case where the selected vehicle is secured in an autonomous robot vehicle, controlling the autonomous robot vehicle to deliver the selected vehicle to the delivery location.

In accordance with aspects of the present disclosure, non-transitory computer storage medium including instructions stored thereon that, when executed by a processor, cause a managing apparatus to perform a method for autonomously repositioning vehicles. The method includes accessing model information and location information for a plurality of vehicles, the plurality of vehicles including at least one of autonomous vehicles or non-autonomous vehicles, receiving a request including a delivery location and a chosen model for renting, selecting a vehicle of the chosen model among the plurality of vehicles based on the model information, the location information, and the delivery location, and communicating instructions to autonomously reposition the selected vehicle to the delivery location.

Further details and aspects of exemplary embodiments of the present disclosure are described in more detail below with reference to the drawings.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The present disclosure and its various aspects and features are described below with reference to the accompanying drawings.

DETAILED DESCRIPTION

Figure 1:
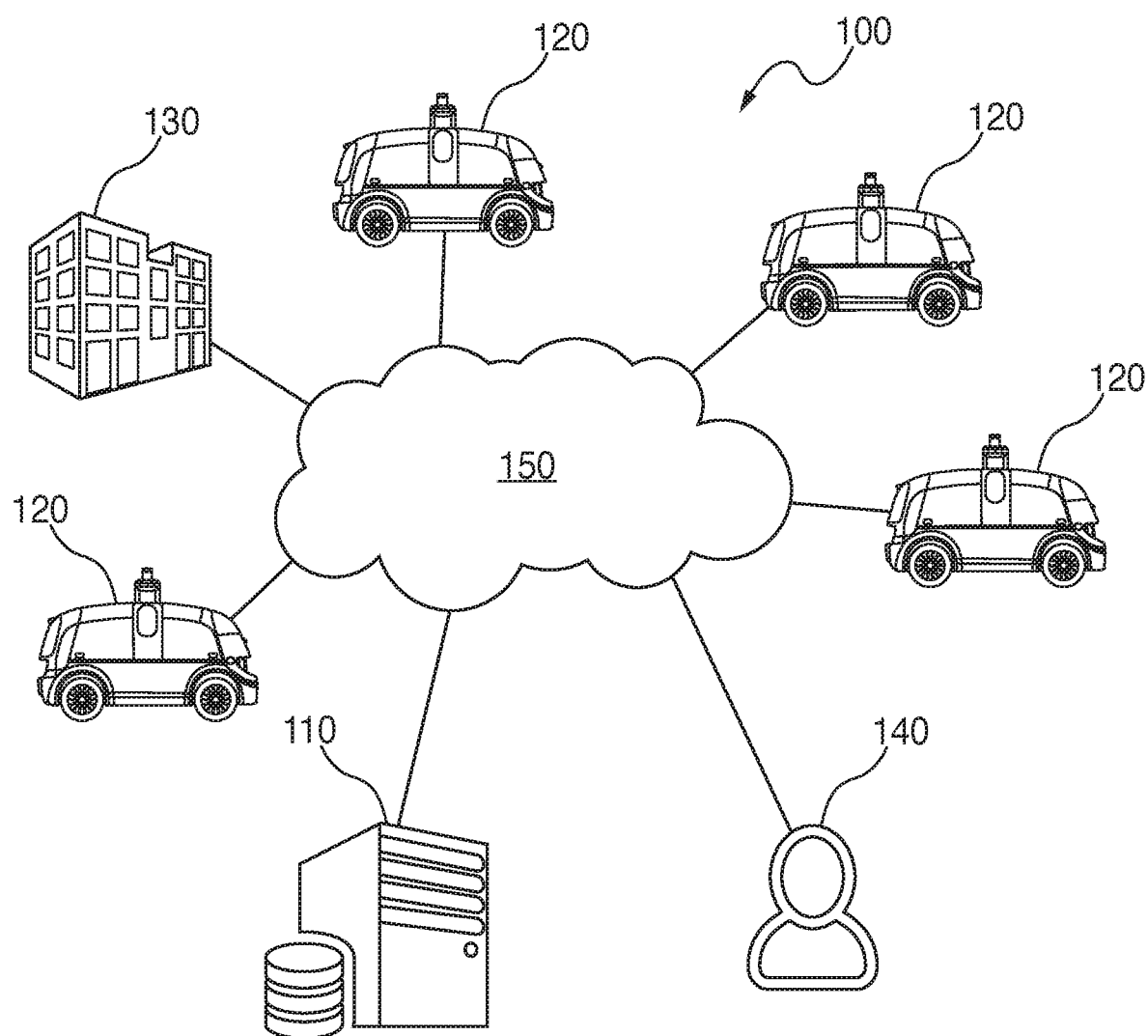
FIG. 1 is an illustration of a management system for delivering rental vehicles in accordance with embodiments of the present disclosure.

This disclosure relates to management systems and methods for autonomously repositioning rental vehicles and, in particular, to a managing server for optimizing delivery of rental vehicles. In one aspect, the present disclosure provides systems and methods for receiving requests for rental vehicles and for autonomously delivering the requested rental vehicles. In an aspect, the requested rental vehicles may be fully-autonomous or semi-autonomous and may be remotely operated by a human operator. Remote control of the robot vehicles may be appropriate in various situations. For example, if the requested rental vehicle is to travel to a destination that has not been fully mapped (e.g., large corporate, university campuses, public parks, etc.), the requested rental vehicle may not be able to determine how to reach the destination. Further, when the requested rental vehicle is delivered by a robot vehicle, the robot vehicle may not be able to determined how to reach the destination. Accordingly, the capability for a human operator to remotely operate a requested rental vehicle or a robot vehicle is beneficial.

Provided herein is a management server for coordination of the rental vehicles and a robot fleet, including rental vehicles within the robot fleet that are configured for transporting, delivering or retrieving rental vehicles. The managing server may include a mobile web server, web server, database, authentication module, payment module, navigation module, network interface, and optimization module.

As used herein, the term "autonomous" includes fully-autonomous, semi-autonomous, and any configuration in which a vehicle can operate in a controlled manner for a period of time without human intervention.

As used herein, the term "fleet," "sub-fleet," and like terms are used to indicate a number of land vehicles, watercraft or aircraft operating together or under the same ownership. In some embodiments the fleet or sub-fleet is engaged in the same activity. In some embodiments, the fleet or sub-fleet are engaged in similar activities. In some embodiments, the fleet or sub-fleet are engaged in different activities.

As used herein, the term "robot," "robot vehicle," "robot fleet," "vehicle," "all-terrain vehicle," and like terms are used to indicate a mobile machine that transports rental vehicles or is itself a rental vehicle. Typical rental vehicles include cars, wagons, vans, motor vehicles (e.g., tricycles, trucks, trailers, buses, etc.), railed vehicles (e.g., trains, trams, etc.), watercraft (e.g., ships, boats, ferries, landing craft, barges, rafts, etc.), aerial drones, hovercraft (air, land and water types), aircraft, and even including spacecraft.

As used herein, the term "user," "operator," "fleet operator," and like terms are used to indicate the entity that owns or is responsible for managing and operating the robot fleet.

As used herein, the term "customer" and like terms are used to indicate the entity that requests the services provided by the robot fleet.

As used herein, the term "server," "computer server," "central server," "main server," "mobile device," "smart device," and like terms are used to indicate a computer or device on a network that manages the fleet resources, namely the robot vehicles.

As used herein a "mesh network" is a network topology in which each node relays data for the network. All mesh nodes cooperate in the distribution of data in the network. It can be applied to both wired and wireless networks. Wireless mesh networks can be considered a type of "Wireless ad hoc" network. Thus, wireless mesh networks are closely related to Mobile ad hoc networks (MANETs). Although MANETs are not restricted to a specific mesh network topology, Wireless ad hoc networks or MANETs can take any form of network topology. Mesh networks can relay messages using either a flooding technique or a routing technique. With routing, the message is propagated along a path by hopping from node to node until it reaches its destination. To ensure that all its paths are available, the network must allow for continuous connections and must reconfigure itself around broken paths, using self-healing algorithms such as Shortest Path Bridging. Self-healing allows a routing-based network to operate when a node breaks down or when a connection becomes unreliable. As a result, the network is typically quite reliable, as there is often more than one path between a source and a destination in the network. This concept can also apply to wired networks and to software interaction. A mesh network whose nodes are all connected to each other is a fully connected network.

As used herein, the term "module" and like terms are used to indicate a self-contained hardware component of the central server, which in turn includes software modules. In software, a module is a part of a program. Programs are composed of one or more independently developed modules that are not combined until the program is linked. A single module can contain one or several routines, or sections of programs that perform a particular task. As used herein the fleet management module includes software modules for managing various aspects and functions of the robot fleet.

The Managing Server

FIG. 1 show a management system 100 for autonomously repositioning rental vehicles or for delivering the rental vehicle by using the robot fleet 120 in accordance with embodiments of the present disclosure. The management system 100 includes a managing server 110 and one or more robot vehicles of robot fleet 120. In an aspect, the management system 100 may include a parking station 130 where rental vehicles of different types and of different models are securely parked. The managing server 110, the robot fleet 120, and the parking station 130 communicate with each other via a network 150.

When a customer 140 makes a request for a rental vehicle, the managing server 110 receives the request via the network 150. The managing server 110 may communicate with the robot fleet 120 and the parking station 130 to receive location information of the robot fleet 120 and the parking station 130 and model information of rental vehicles securely parked in the parking station 130 or loaded in the robot fleet 120. In an aspect, the managing server 110 may request the delivery location and the model information chosen by the customer 140.

Based on the delivery location and the chosen model, the managing server 110 may determine whether the parking station 130 or the robot fleet 120 includes a rental vehicle of the chosen model, optimize routes to the delivery location based on the location information of the robot fleet 120 and the parking station 130, select a vehicle of the chosen model based on the optimized route, and deliver the rental vehicle to the delivery location.

In some embodiments, when the rental vehicle of the chosen model is autonomous, the managing server 110 instructs the rental vehicle to fully-autonomously or semi-autonomously travel to the delivery location. In this case, the managing server 110 sets a mode of the rental vehicle as a fully-autonomous or semi-autonomous navigation mode so that the rental vehicle fully-autonomously or semi-autonomously travels to the delivery location. In various embodiments, in the semi-autonomous navigation mode, the rental vehicle may be operated by a remote operator of the managing server 110. As used herein, the term "autonomous navigation mode" will refer to one of or both of fully-autonomous navigation mode or semi-autonomous navigation mode.

When the rental vehicle autonomously travels to the delivery location and a customer is able to access the rental vehicle after passing authentication, the managing server 110 sets the mode of the rental vehicle as a manual operation mode so that the customer is able to manually drive the rental vehicle.

The managing server 110 may receive an occupied status from the rental vehicle. If the customer obtains a right to access the rental vehicle, the rental vehicle may send to the managing server 110 the occupied status indicating that the customer is on the rental vehicle. When the customer is in the rental vehicle, the managing server 110 sets the mode of the rental vehicle as the manual operation mode so that the customer can manually drive the rental vehicle. In some embodiments, the customer may override and set the mode of the rental vehicle to the autonomous navigation mode even when the occupancy status indicates that the customer is in the rental vehicle.

In some embodiments, when the customer's use of the rental vehicle is completed, the customer can indicate the rental completion to the managing server 110 and/or to the rental vehicle. In various embodiments, the customer can indicate the rental completion by the interface of FIG. 3. In various embodiments, the rental vehicle may send the rental completion indicator to the managing server 110.

Upon receiving the rental completion indicating that the rental is completed, the managing server 110 can instruct the autonomous vehicle to switch the mode of the rental vehicle from the manual operation mode to the autonomous navigation mode so that the rental vehicle is autonomously travels to another destination. In this way, the customer/customer saves times/efforts by not having to find out and go to a parking lot before and after using the rental vehicle. The parking lot may be a temporarily available location near the current location of the rental vehicle or a location dedicated to the rental vehicle.

In case when the rental vehicle is securely loaded in a robot vehicle and the managing server 110 determines that the robot vehicle is faster or better suited for delivering the rental vehicle at the delivery location at the requested time, the managing server 110 instructs the robot vehicle to deliver the rental vehicle. Or, the managing server 110 may instruct the robot vehicle to unload the rental vehicle therefrom and instruct the unloaded rental vehicle to autonomously travel to the delivery location.

In some embodiments, when the chosen model is manually-operated, the managing server 110 determines whether chosen model is securely parked in the parking station 130 or loaded in the robot fleet 120. In case when a rental vehicle of the chosen model is securely parked in the parking station 130, the managing server 110 further determines which robot vehicle from the robot fleet 120 is closely located to the parking station 130 and selects the closest robot vehicle. Then, the managing server 110 controls the robot vehicle to pick up the rental vehicle and to deliver the rental vehicle to the delivery location.

In a case when the rental vehicle of the chosen model is securely loaded into one or more robot vehicles, the managing server 110 further determines which robot vehicle is closest to the delivery location, the managing server 110 then control the closest robot vehicle to autonomously drive to the delivery location and to unload the rental vehicle of the chosen model.

Configuration of a robot vehicle may be for land travel, such as a small fully-autonomous (or semi-autonomous) automobile. The fully-autonomous (or semi-autonomous) automobile may be narrow (e.g., 2-5 feet wide) or wide (e.g., greater than 5 feet wide), low mass and low center of gravity for stability, having multiple secure compartments assignable to one or more customers, retailers and/or vendors, and designed for moderate working speed ranges (i.e., 1.0-45.0 mph) to accommodate inner-city and residential driving speeds. Additionally, in some embodiments, the land vehicle robot units in the robot fleet are configured with a maximum speed range from 1.0 mph to about 90.0 mph for high speed, intrastate or interstate driving. Each robot in the fleet is equipped with onboard sensors 170 (e.g., cameras (running at a high frame rate, akin to video), LiDAR, radar, ultrasonic sensors, microphones, etc.) and internal computer processing to constantly determine where it can safely navigate, what other objects are around each robot and what it may do.

In in some embodiments, the robot fleet 120 may be fully-autonomous.

In in some embodiments, the robot fleet 120 may be semi-autonomous. In some embodiments, it may be necessary to have human interaction between the robot fleet 120, the fleet operator, and the customer 140 to address previously unforeseen issues (e.g., a malfunction with the navigation module; provider inventory issues; unanticipated traffic or road conditions; or direct customer interaction after the robot arrives at the customer location).

In in some embodiments, the robot fleet 120 may be controlled directly by a fleet operator. In some embodiments, it may be necessary to have direct human interaction between the robot vehicle the robot fleet 120 and/or the fleet operator to address maintenance issues such as mechanical failure, electrical failure or a traffic accident. In an aspects, the fleet operator may remotely operate robot vehicles.

In some embodiments, the robot fleet 120 may be configured for land travel. In some embodiments, each robot land vehicle in the robot fleet 120 is configured with a working speed range from 13.0 mph to 45.0 mph. In some embodiments, the land vehicle robot units in the fleet are configured with a maximum speed range from 13.0 mph to about 90.0 mph.

In some embodiments, the robot fleet 120 may be configured for water travel as a watercraft and is configured with a working speed range from 1.0 mph to 45.0 mph.

In some embodiments, the robot fleet 120 may be configured for hover travel as an over-land or over-water hovercraft and is configured with a working speed range from 1.0 mph to 60.0 mph.

In some embodiments, the robot fleet 120 may be configured for air travel as an aerial drone or aerial hovercraft and is configured with a working speed range from 1.0 mph to 80.0 mph.

In some embodiments of the robot fleet 120, the autonomous robot vehicles within the robot fleet 120 may be further configured to be part of a sub-fleet of autonomous robots, and each sub-fleet may be configured to operate independently or in tandem with multiple sub-fleets having two or more sub-fleets.

In some embodiments, the robot fleet 120 may be controlled directly by the customer 140 without a physical key.

In some embodiments, there will likely be times when a robot vehicle breaks down, has an internal system or module failure or is in need of maintenance. For example, in the event that the navigation module should fail, each robot vehicle within the fleet is configurable to allow for direct control of the robot's processor to override the conveyance and sensor systems (i.e., cameras, etc.) by a fleet operator to allow for the safe return of the vehicle to a base station for repair.

Figure 2:
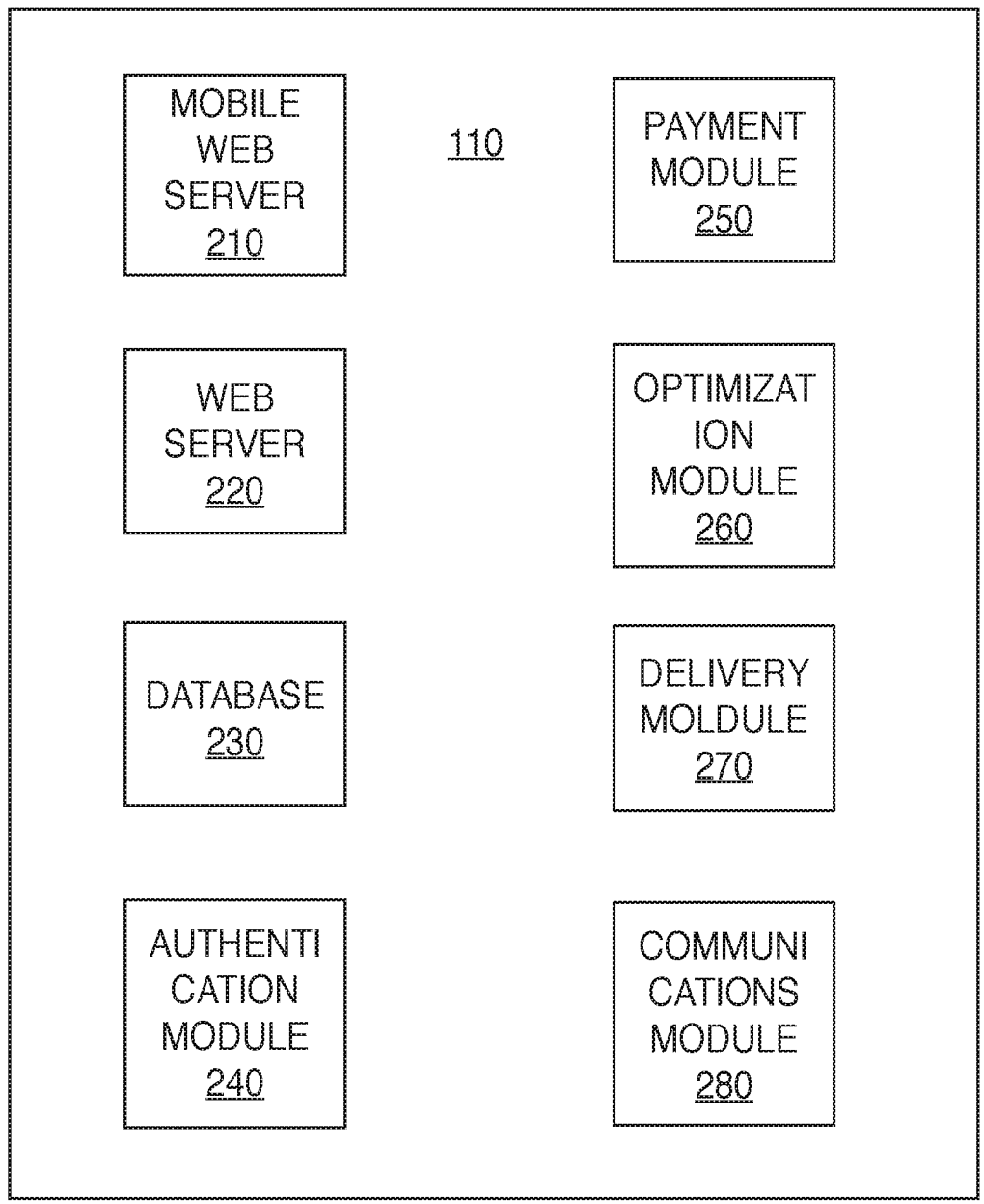
FIG. 2 is a functional block diagram of the managing server of FIG. 1 in accordance with embodiments of the present disclosure.

FIG. 2 illustrates a functional block diagram of the managing server 110 of FIG. 1 in accordance with embodiments of the present disclosure. The managing server 110 may have functions such as mobile web server 210, web server 220, database 230, authentication module 240, payment module 250, optimization module 260, navigation module 270, and communications module 280.

The mobile web server 210 provides mobile web service for smart devices including personal data assistances, tablets, smartphones, etc. The mobile web service may be user interface, via which customers may make a request for an rental vehicle. The user interface may look like an interface shown in FIG. 3. The user interface may include textual content asking for information, such as model information, delivery location, and usage duration. The model information indicates a kind of rental vehicle, the delivery location indicates a location that the customer wants the rental vehicle to be delivered, and the usage duration is a temporal duration that the customer wants to use the rental vehicle. The user interface may further include login page so that mobile customers can log in to the user interface provided by the mobile web server 210.

Figure 3:
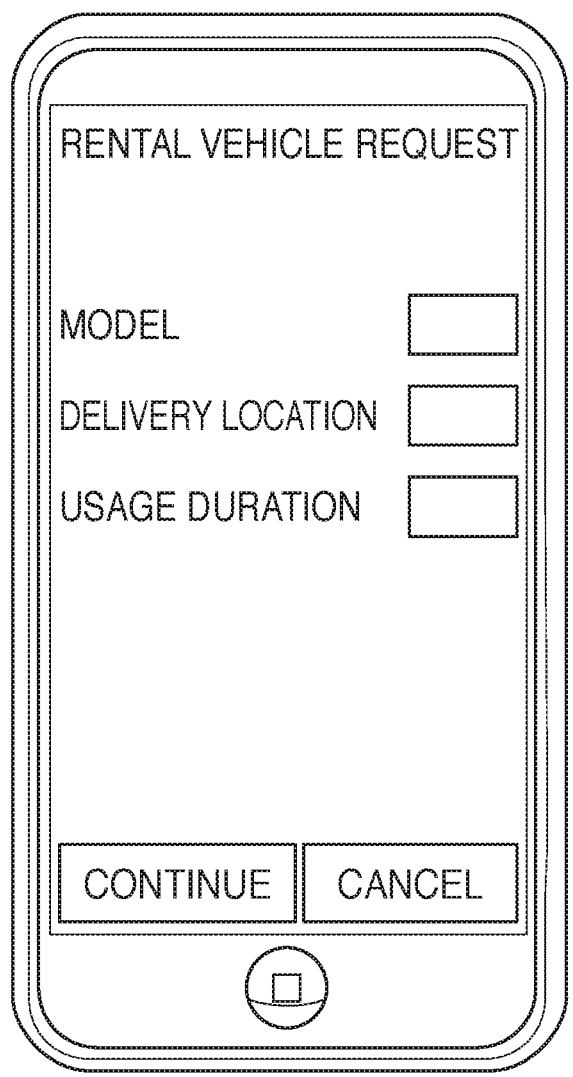
FIG. 3 is an illustration of an interface for requesting rental vehicles in accordance with embodiments of the present disclosure.

As shown in FIG. 3, after entering model, delivery location, and the usage duration, the customer may further continue to a next stage or cancel the request by clicking "CONTINUE" or "CANCEL" button, respectively, in the bottom of the user interface. The information requested by the mobile web server 210 as shown in FIG. 3 is only examples but not limited thereto. For example, the user interface may further request the customer to provide a type of rental vehicle, such as autonomous vehicles, manually-driven vehicles, bicycles, watercrafts, hovercrafts, and drones, among other types of vehicles.

The web server 220 functions like the mobile web server 210. In general, mobile service is simpler than normal web service due to the display size of mobile or smart devices. In this sense, the web server 220 provides web service, which is more robust in design and features for customers than the service provided by the mobile web server 210. In an aspect, the mobile web server 210 and the web server 220 may be incorporated into one module and capable of discerning a request from computers from requests from mobile or smart devices.

The database 230 may store information related to requests for rental vehicles, such as requested models, delivery locations, and usage durations. Further, the database 230 may store customer information, authentication information, and payment information. Based on the customer information, the user interface provided by the mobile web server 210 and the web server 220 may fill blanks for the model, delivery location, and usage duration, as defaults. Such already-filled information may be editable by customers.

The database 230 may include data structure saved in a memory or portable memory with a program such as MySQL, Oracle® RDBMS, QuickBase, SAP Sybase, Microsoft® Excel® or Access®, IBM® DB2, ADABAS, etc. The data stored in the memory may be accessed by a query language, such as SQL, QUEL, MySQL, etc. The database 230 may be relational database, non-relational database, or distributed database.

Further, the database 230 may store information of the inventories securely parked in the parking station 130 or the robot fleet 120 of FIG. 1. The inventory information may include make years, types, usage hours, history of rental vehicles, accident records, maintenance records, etc. Furthermore, the database 230 may store current locations of each rental vehicle. The current location of each rental vehicle may be a specific parking spot in the parking station 130, when it is parked in the parking station 130, or a robot vehicle when it is securely loaded into a compartment thereof.

In embodiments, the database 230 may further store geographical information about surrounding areas covered by the managing server 110. Such geographical information may be used in determining an optimum route for delivery in connection with location information of the robot fleet 120 and the parking station 130.

The managing server 110 may further include the authentication module 240 for authenticating customers. The authentication module 240 may authenticate customers via textual information, biometric information, or double confirmation. For example, textual authentication may be a login ID and the corresponding password, or a passcode.

The biometric authentication may be performed based on information of body parts specific to the customer, such as iris, fingerprints, face, etc. In this case, the authentication module 240 may include an image capturing device to take a picture of the iris or face, or a sensor to sense a fingerprint. Further, the authentication module 240 may execute an image recognition program detecting specificities of the iris, face, or fingerprint. Such specificities may be compared with biometric information for the customer saved in the database 230 to authenticate the customer.

The double confirmation may be a combination of textual authentication or biometric authentication. For example, after a customer enters authentication information, the authentication module 240 may send a text message to the customer's mobile phone so that the authentication module 240 authenticates the customer after the authentication module 240 confirms that the text message that the customers enters matches the text message the authentication module 240 has sent. In an aspect, the double confirmation may be provided by a third party, such as an authenticator provided by Google®. The authenticator provides a series of alphanumerical texts, which is constantly changing every predetermined period and can be seen only by a customer who installed the authenticator on his/her mobile device. After the series of alphanumerical texts provided by the customer 140 is confirmed by the authentication module 240, the customer may be authenticated.

In some embodiments, the authentication module 240 may use an RFID reader installed on each of the robot fleet 120. The customer 140 can be authenticated using the mobile phone over the RFID reader.

WON In some embodiments, the authentication module 240 may authenticate the customer by a government ID, or a business ID badge using cameras or magnetic readers on each of the robot fleet 120.

The payment module 250 may be used to receive payments before or at the time of renting rental vehicles. After receiving all necessary information from customers, the payment module 250 asks the customers for payment for renting a rental vehicle. For example, when a customer presses "CONTINUE" button in FIG. 3, the payment module 250 displays a payment request on the interface. The payment may be made via a wired transfer, wireless transfer, mobile transfer, cryptocurrency, cash, credit/debit card, loyalty card, or accumulated credit points. This list of payment options is not intended to be limited thereto but is provided for explaining purposes.

In an aspect, the payment module 250 may not display the payment request at the request stage but displays it at the time of actual delivery of the rental vehicle to the customer. Under this situation, the customer cannot access the rental vehicle at the delivery until the customer pays the payment via any method.

In another aspect, the payment module 250 may charge extra payment in cases where customers use the rental vehicle for a duration exceeding the usage duration identified by the customers or where there are damages to rental vehicles.

Now turning back to the optimization module 260 of the managing server 110, the optimization module 260 may optimize a route to the delivery location identified by the customer 140. The optimization module 260 determines an optimum route based on location information of the parking station 130 and the delivery location when a chosen model is securely parked in the parking station 130. In case the chosen model is not parked in the parking station 130 but securely loaded in the robot fleet 120, the optimization module 260 determines an optimum route based on location information of the robot fleet 120 and the delivery location. The location information of the parking station 130 and the robot fleet 120 may be retrieved from the database 230.

Further, in case there are two or more robot vehicles, which load the chosen model, the optimization module 260 further determines an optimum robot vehicle, which can deliver a rental vehicle of the chosen model to the delivery location faster and/or safer than the other robot vehicles in the robot fleet 120.

In some embodiments, the optimization module 260 may retrieve geographical information from the database 230 and determine an optimum route. Further, the optimization module 260 may receive up-to-date traffic information from Internet and determine an optimum route to the delivery location based on the geographical information and the traffic information when delivering the rental vehicle.

In some embodiments, the optimization module 260 may also determine an optimum route when customers return rental vehicles. If the rental vehicle is an autonomous vehicle, the optimization module 260 determines an optimum route so that the rental vehicle is autonomously guided to the parking station 130 or the nearest robot vehicle. If the rental vehicle is a manually-driven vehicle, the optimization module 260 determines the closest robot vehicle to the current location of the rental vehicle, which is capable of loading the rental vehicle and delivering to the parking station 130.

In case where the rental vehicle can be loaded to and kept in a robot vehicle, the optimization module 260 may determine the robot vehicle to load the rental vehicle and to keep it. In this way, the optimization module 260 can determine an optimum way to save time by not sending the robot vehicle to the parking station 130 and by delivering the rental vehicle directly to another delivery location without picking it up from the parking station 130.

Over time, the managing server 110 may anticipate demand for rental vehicles by storing data concerning how many orders (and what type of rental vehicles) are made at particular times of day from different areas of the region. This can be done for delivery locations. Then, for a specific current day and time, the optimization module 260 determines based on this stored order history data optimal locations for the robot fleet 120 given the expected demand. More concretely, the robot fleet 120 can be positioned to be as close as possible to the expected customer locations, anticipating these customer locations will be the most likely new orders to come into the managing server 110. Even more concretely, it is possible that the optimization module 260 estimates the number of orders from each possible customer in the next hour and weight each customer location by this number. Then, the managing server 110 can position the robot fleet 120 so that the robot fleet 120 optimally covers the weighted locations based on the order history data.

In some embodiments, the optimization module 260 customizes the positioning of the robot fleet 120 based on anticipated uses, a pattern of historical behaviors, or specific rental vehicles being delivered.

Now referring back to the navigation module 270, each robot vehicle in the robot fleet 120 further includes the navigation module 270 for navigation in the unstructured open or closed environments (e.g., digital maps, HD maps, GPS, etc.). In some embodiments, the robot vehicle relies on maps generated by the user, operator, or fleet operator, specifically created to cover the intended environment where the robot vehicle is configured to operate. These maps would then be used for general guidance of each robot in the fleet, which would augment this understanding of the environment by using a variety of on-board sensors such as cameras, LiDAR, altimeters or radar to confirm its relative geographic position and elevation.

In some embodiments, unstructured open environment is a non-confined geographic region accessible by navigable pathways, including, for example, public roads, private roads, bike paths, open fields, open public lands, open private lands, pedestrian walkways, lakes, rivers or streams.

In some embodiments, the closed environment is a confined, enclosed or semi-enclosed structure accessible by navigable pathways, including, for example, open areas or rooms within commercial architecture, with or without structures or obstacles therein, airspace within open areas or rooms within commercial architecture, with or without structures or obstacles therein, public or dedicated aisles, hallways, tunnels, ramps, elevators, conveyors, or pedestrian walkways.

In some embodiments, the unstructured open environment is a non-confined airspace or even near-space environment which includes all main layers of the earth's atmosphere including the troposphere, the stratosphere, the mesosphere, the thermosphere and the exosphere.

In some embodiments, the navigation module 270 controls routing of the conveyance system of the robot vehicles in the robot fleet 120 in the unstructured open or closed environments.

In some embodiments, the navigation module 270 uses internal maps to provide information about where they are going and the structure of the road environment (e.g., lanes, etc.) and combine this information with onboard sensors (e.g., cameras, LiDAR, radar, ultrasound, microphones, etc.) and internal computer processing to constantly determine where they can safely navigate, what other objects are around each robot and what they may do. In still other embodiments, the robot fleet 120 incorporates on-line maps to augment internal maps. This information is then combined to determine a safe, robust trajectory for the robot to follow and this is then executed by the low level actuators on the robot.

In some embodiments, the navigation module 270 relies on a global positioning system (GPS) that allows land, sea, and airborne users to determine their exact location, velocity, and time 24 hours a day, in all weather conditions, anywhere in the world.

In some embodiments, the navigation module 270 uses a combination of internal maps, sensors and GPS systems to confirm its relative geographic position and elevation.

In some embodiments, the navigation module 270 is strategically positioned throughout a geographic region in anticipation of a known demand.

After the optimization module 260 determines an optimum route to the delivery location, the navigation module 270 interactively communicates with an autonomous rental vehicle or a robot vehicle to guide it to the delivery location following the optimum route. While following the optimum route, the navigation module 270 receives monitoring results from the autonomous rental vehicle of the chosen model or the robot vehicle delivering the rental vehicle of the chosen model and adjusts the optimum route based on the monitoring results. In particular, the autonomous rental vehicle or the robot vehicle may be equipped with sensors or image capturing devices to monitoring surroundings thereof and network interface to transfer the monitoring results to the navigation module 270. By using the real-time monitoring result, the navigation module 270 may be able to guide autonomous rental vehicles or the robot fleet 120 to a better route to the delivery locations. In order to find a better route, the navigation module 270 may send real-time monitoring results to and communicate with the optimization module 260 so that the optimization module 260 may find a better route real-time.

Further, the navigation module 270 may provide an optimum route or better route based on monitoring results when the rental vehicle of the chosen model is returned, in a similar way as delivering it to the delivery location.

Each robot vehicle in the robot fleet 120 further includes the communication module 280 configurable to communicate among modules of the managing server 110, or between modules of the managing server 110 and a rental vehicle of the chosen model or the robot fleet 120 via intranet or Internet. In some embodiments, the data is related to at least user interactions and the robot fleet 120 interactions, including, for example, scheduled requests or orders, on-demand requests or orders, or a need for self-positioning of the robot fleet 120 based on anticipated demand within the unstructured open or closed environments.

In some embodiments, each robot vehicle in the robot fleet 120 includes at least one communication module configurable to receive, store and transmit data, and to store that data to a memory device, for future data transfer or manual download.

In some embodiments, the customer 140 has own application/interface to communicate with the managing server 110 (e.g., "Nuro customer app" for customers on their phone, "Nuro vendor app" for businesses on a tablet or phone or their internal computer system, etc.).

In some embodiments, the communication to the customer and the robot fleet 120, between the robot vehicles of the robot fleet 120, and between the customer and the robot fleet 120, occurs via wireless transmission.

In some embodiments, wireless transmission interactions with the customer 140 and the robot fleet 120 occur via mobile application transmitted by an electronic device and forwarded to the communication module via a central server, a fleet management module, and/or a mesh network.

In some embodiments, one preferred method of communication is to use cellular communication between the managing server 110 and the robot fleet 120, (e.g., 3G, 4G, 5G, or the like). Alternatively, the communication between the managing server 110 and the robot fleet 120 may occur via satellite communication systems.

In some embodiments, the communication module 280 may utilize wireless communication protocols, such as NFC, Bluetooth®, etc.

In some embodiments, a customer uses an application (either on a cellphone, laptop, tablet, computer or any interactive device) to request an rental vehicle delivery via the communication module 280.

In some embodiments, the electronic device includes a phone, a personal mobile device, a personal digital assistant (PDA), a mainframe computer, a desktop computer, a laptop computer, a tablet computer, and/or wearable computing device such as a communication headset, smart glasses, a contact lens or lenses, a digital watch, a bracelet, a ring, jewelry, or a combination thereof.

In accordance with aspects of the present disclosure, the communication module 280 of each robot vehicle may be configured to communicate with a remote human operator. For example, the communication module 280 may communicate environmental videos captured by cameras running at a high frame rate to a remote operator, to enable the remote human operator to visualize the rental vehicle's surroundings. Further, the communication module 280 may receive instructions from the remote human operator for controlling the conveyance system of the robot vehicle.

Now referring back to the robot fleet 120 of FIG. 1, each robot vehicle in the robot fleet 120 includes a conveyance system (e.g., a drive system with a propulsion engine, wheels, treads, wings, rotors, blowers, rockets, propellers, brakes, etc.).

As noted previously, the robot fleet 120 is configurable for land, water or air. Typical rental vehicles include cars, wagons, vans, motor vehicles (e.g., tricycles, trucks, trailers, buses, etc.), railed vehicles (e.g., trains, trams, etc.), watercraft (e.g., ships, boats, ferries, landing craft, barges, rafts, etc.), aerial drones, hovercraft (air, land, and water types), aircraft, and spacecraft.

In one embodiment, a robot land vehicle may be configured with a traditional 4-wheeled automotive configuration comprising conventional steering and braking systems. The drive train is configurable for standard 2-wheel drive or 4-wheel all-terrain traction drive. The propulsion system (engine) is configurable as a gas engine, a turbine engine, an electric motor and/or a hybrid gas/electric engine. Alternatively, the robot could be configured with an auxiliary solar power system to provide back-up emergency power or power for minor low-power sub-systems.

Alternative configurations of components to a total drive system with a propulsion engine could include wheels, treads, wings, rotors, blowers, rockets, propellers, brakes, etc.

In some embodiments, the robot fleet 120 may be configured for water travel as a watercraft with a propulsion system (engine) that is configurable as a gas engine, a turbine engine, an electric motor and/or a hybrid gas/electric engine and is further configured with a propeller.

In some embodiments, the robot fleet 120 may be configured for hover travel as an over-land or over-water hovercraft or an air-cushion vehicle (ACV) and is configured with blowers to produce a large volume of air below the hull that is slightly above atmospheric pressure. The propulsion system (engine) is configurable as a gas engine, a turbine engine, an electric motor and/or a hybrid gas/electric engine.

In some embodiments, the robot fleet 120 may be configured for air travel as an aerial drone or aerial hovercraft and is configured with wings, rotors, blowers, rockets, and/or propellers and an appropriate brake system. The propulsion system (engine) is configurable as a gas engine, a turbine engine, an electric motor and/or a hybrid gas/ electric engine.

In some embodiments, each robot vehicle of the robot fleet 120 may be configured with one or more power sources, which include the power system (e.g., battery, solar, gasoline, propane, etc.).

In some embodiments, the robot fleet 120 may further include a digital display for curated content comprising advertisements (i.e., for both specific user and general public), including services provided, marketing/promotion, regional/location of areas served, customer details, local environment, lost, sought or detected people, public service announcements, date, time, or weather.

Now referring back to FIG. 4, sensor system of the robot fleet 120 is shown. As described above, each of the robot fleet 120 may include image capturing device 410 configured to capture images at high speed so as to monitoring surroundings thereof. Such captured images are sent to the managing server 110, in particular, to the optimization module 260 and the navigation module 270 as monitoring results. The optimization module 260 and the navigation module 270 then can determine an optimum route for the robot vehicle. The image capturing device may be a fish-eye type camera.

In some embodiments, the image capturing device 410 may be used to capture an image of the customer's face, which is to be used to authenticate the customer through the authentication module 240.

The robot fleet 120 may further include a keypad 420 configured to receive input from customers. The keypad 420 may include alpha numerical keys. The customers may input their IDs and passcodes through the keypad 420 and may open one of the compartments of the robot fleet 120 to obtain a rental vehicle stored therein. Further, the customers may unhitch an rental vehicle fastened to the robot vehicle.

In some embodiments, the keypad 420 may be used to call an operator to make an oral authentication.

The robot fleet 120 may further include a scanner 430 configured to scan fingerprints of the customers. The scanned fingerprints may be authenticated by the authentication module 240.

In some embodiments, the sensor system of the robot fleet 120 may include LiDAR, radar, ultrasonic sensors, microphones, etc.) and internal computer processing 125 to constantly determine where it can safely navigate, what other objects are around each robot, and what it may do within its immediate surroundings.

In some embodiments, the robot fleet 120 may be equipped with debit/credit card readers to perform financial transactions via the payment module 250.

The robot fleet 120 may further include one or more compartments 440 configured to securely load rental vehicles. When an rental vehicle is loaded into one compartment 440, the rental vehicle is securely locked so that it does not move during delivery or moving. The compartments 440 may also be used as storage purposes.

In some embodiments, the compartments 440 may be humidity and temperature controlled. Further still, the compartment(s) are configurable with various amenities, such as compartment lighting for night deliveries.

In some embodiments, the compartments 440 may be configurable for various rental vehicles. Such configurations include car locking systems or bike rags.

In some embodiments, the compartments 440 are variably configurable based on anticipated demands, patterns of behaviors, or types of rental vehicles to be transported.

Figure 4:
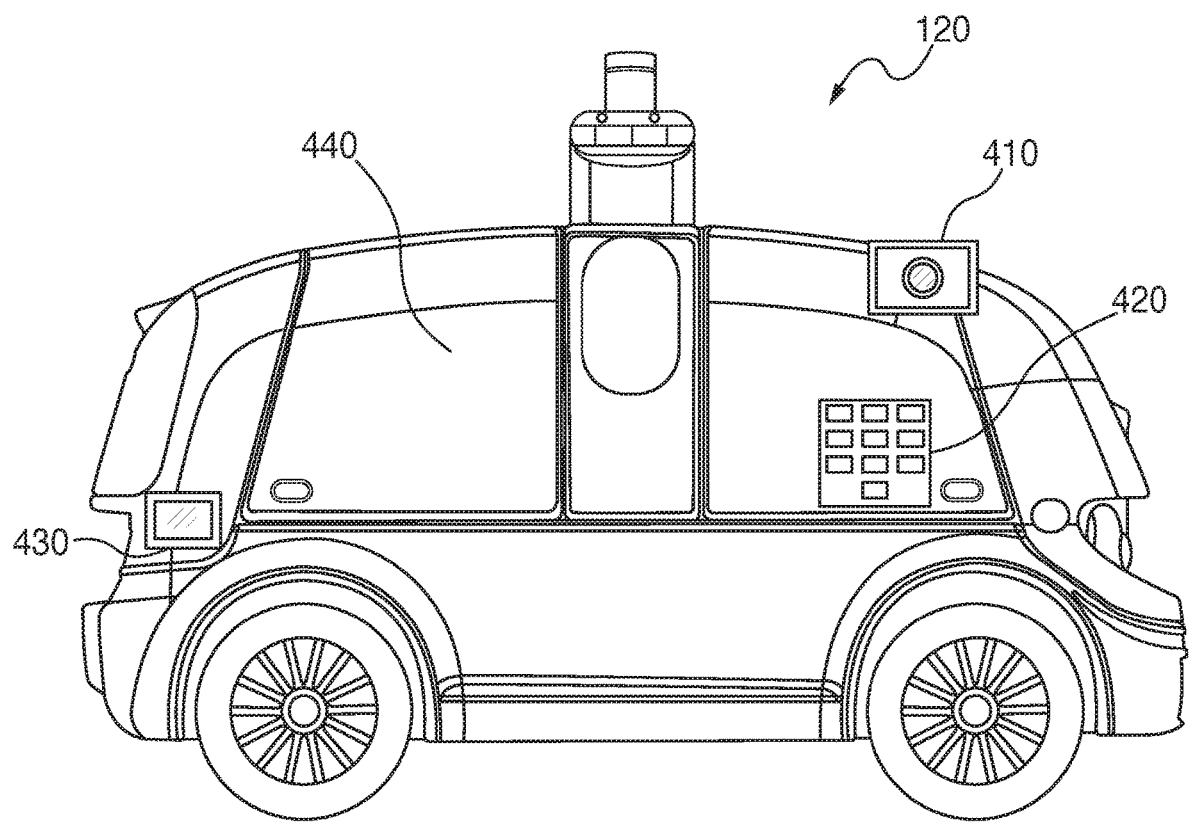
FIG. 4 is an illustration of the robot fleet of FIG. 1 in accordance with embodiments of the present disclosure.

Further still, the robot fleet 120 may include a controller, which is not shown in FIG. 4, configurable to associate each one of the compartments 440 to an assignable customer and provide rental vehicles when authorized. Each the robot fleet 120 may further include at least one processor configured to manage the conveyance system, the navigation module, the sensor system, instructions from the optimization module 260, the navigation module 270, and the communication module 280.

When a robot vehicle is assigned to a customer, one or more of the compartments 440 are also assigned to that customer. Each of the compartments 440 may be separately secured and can securely transport rental vehicles to the corresponding customer.

Further still, in some embodiments, each of the robot fleet 120 may be equipped with a controller configurable to associate each one of the compartments 440 to an assignable customer and to provide an access right of the corresponding compartment when authorized.

The robot fleet 120 may further include a towing part, which can hitch an rental vehicle at the back thereof. For example, the robot fleet 120 may include a hitch, ball-mount hitch, or wiring harness in the back so that the rental vehicle can be securely hitched to the robot vehicle.

The following will now describe control and processing in connection with remote operation of the robot fleet 120 by a human operator. As mentioned above, remote operation of a fully-autonomous or a semi-autonomous vehicle may be appropriate in various situations. The capability for a human operator to remotely operate an autonomous vehicle is beneficial even where the autonomous vehicle can be locally operated by a human operator. This capability becomes much more important where the interior space of the autonomous vehicle is configured to maximize commercial carrying capacity and includes no space for a human operator to locally operate the rental vehicle from within the autonomous vehicle.

In some embodiments, FIG. 4 also shows features of autonomous rental vehicles to be delivered to customers. For example, the autonomous rental vehicle may include the image capturing device 410 for navigation and/or authentication, the keypad 420 for authentication, and the scanner 430 for authentication. When the customer is authenticated, the customer receives an access right and drive the autonomous rental vehicle without a physical key.

Figure 5A:
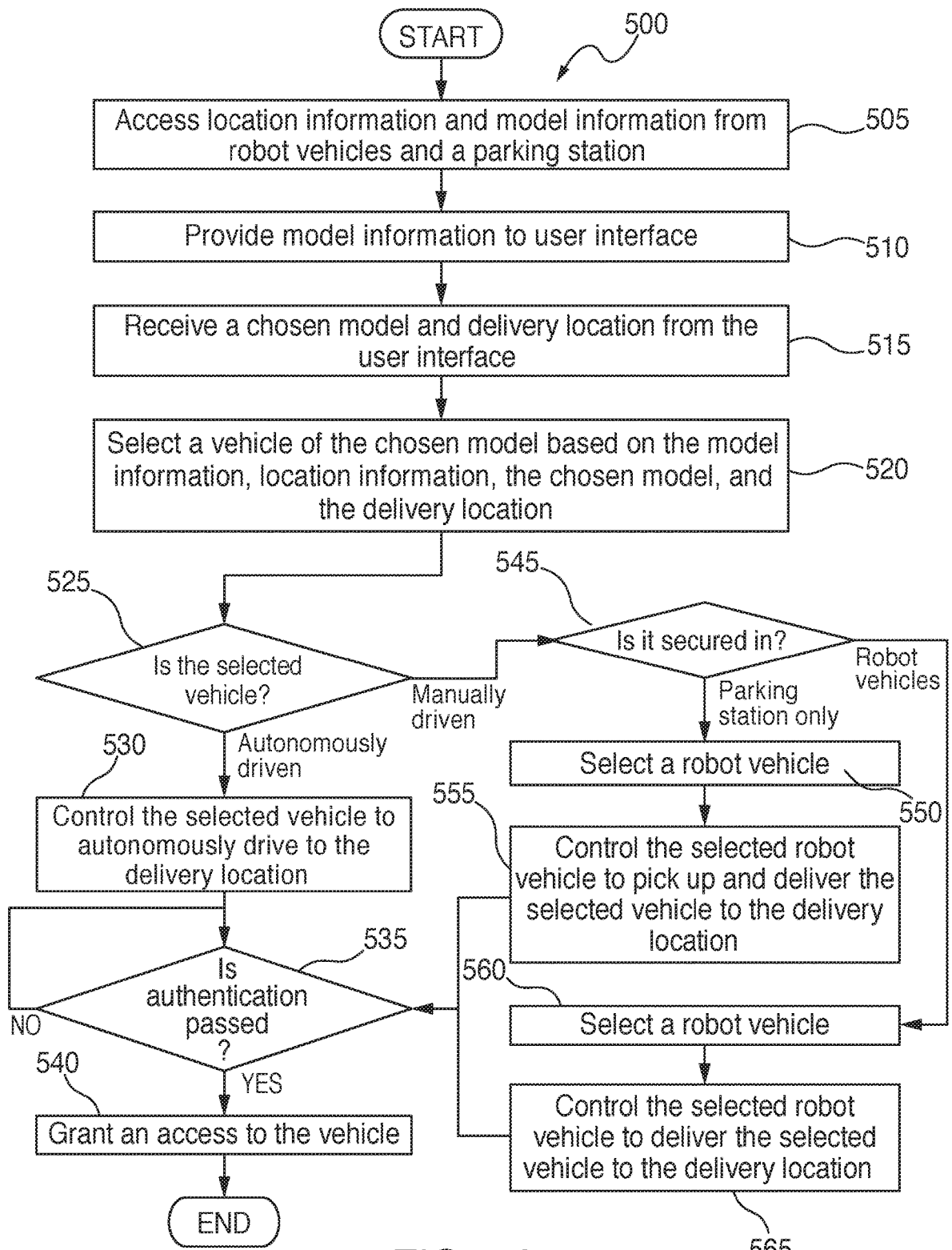
FIG. 5A is a flowchart illustrating a method for delivering rental vehicles in accordance with embodiments of the present disclosure.

Now referring back to FIG. 5A, a flowchart is shown illustrating a method 500 for delivering rental vehicles to delivery locations in accordance with embodiments of the present disclosure. The method 500 starts with receiving location information and model information of a plurality of rental vehicles in step 505. The location information of the plurality of rental vehicles may be a location where each rental vehicle is securely located or parked. The model information may include models of rental vehicles.

In step 510, the model information are sent to user interface so that a user may see available models. In particular, the location information may be sent to the user interface so that models available near the customer's location may be provided to the customer based on the location information. The user interface may also provide types of rental vehicles, such as cars, wagons, vans, motor vehicles (e.g., tricycles, trucks, trailers, buses, etc.), railed vehicles (e.g., trains, trams, etc.), watercraft (e.g., ships, boats, ferries, landing craft, barges, rafts, etc.), aerial drones, hovercraft (air, land, and water types), aircraft, and spacecraft. The types or model information may be provided in a drop down menu or radio buttons. In an aspect, the customer may manually enter the customer's chosen model.

As shown in FIG. 3, customers may be asked to provide a delivery location and a usage duration. Further, the user interface may also require customers to provide a return location, if different from the delivery location, and any other information necessary for delivering and retrieving rental vehicles.

In embodiments, vehicle availability, vehicle types, battery/gas levels sufficient for service durations, vehicles' ability to travel to customers within customers' chosen time may be considered so that available vehicles are provided to customers.

In step 515, a managing server receives the chosen model and delivery location as entered or selected by the customer via the user interface. The managing server then selects a rental vehicle of the chosen model based on the model information and the location information of the parking station and the robot vehicles in step 520.

The managing server determines whether the selected rental vehicle is autonomous or non-autonomous in step 525. In a case that the selected rental vehicle is determined to be autonomous, the managing server instructs the selected rental vehicle to autonomously drive to the delivery location in step 530. In an embodiment, when the selected rental vehicle is loaded or hitched to a robot vehicle, the managing server may instruct the robot vehicle to unload or unhitch the selected rental vehicle and instruct the selected rental vehicle to autonomously drive to the delivery location. In another embodiment, when the selected rental vehicle is loaded or hitched to a robot vehicle, the managing server may instruct the robot vehicle to autonomously drive to the delivery location and to unload or unhitch the selected rental vehicle at the delivery location.

In a case that the selected rental vehicle is determined to be non-autonomous, the managing server further determines whether the selected rental vehicle is secured in the parking station or robot vehicles in step 545. When it is determined to be secured in the parking station, the managing server selects a robot vehicle based on the location information of the robot vehicles in step 550. The managing sever may utilize an optimization algorithm to select a robot vehicle, which is closest to the parking station and has availability to load the selected rental vehicle.

In step 555, the managing server then controls the selected robot vehicle to drive up to the parking station, pick up the selected rental vehicle, and deliver the selected rental vehicle to the delivery location. In an embodiment, the selected rental vehicle may be hitched to the selected rental vehicle if it is too large to fit into compartments of the selected robot vehicle or if no compartments of the selected robot vehicle are available.

In a case when the selected rental vehicle is determined to be secured in one or more robot vehicles in step 545, the managing sever selects a robot vehicle based on the location information of the robot vehicles in step 560. In an embodiment, the managing server may select the robot vehicle, which can deliver the selected rental vehicle to the delivery location faster and more secured than any other robot vehicles, which have a rental vehicle of the chosen model.

In step 565, the managing server controls the selected robot vehicle to autonomously deliver the selected rental vehicle of the chosen model to the delivery location.

When the selected rental vehicle of the chosen model is delivered at steps 530, 555, and 565, the customer has to go through an authentication process in step 535. The customer may provide an ID and password to the vehicle via a keypad installed on the selected rental vehicle or, the selected rental vehicle may take a picture of a portion of the customer, such as iris or face. Further, the selected rental vehicle may also have a scanner scanning the customer's fingerprint or government IDs. When the customer passes the authentication in step 535, the customer may obtain an access right to the selected rental vehicle in step 540. In an embodiment, the customer may drive the selected rental vehicle without a physical key after the authentication. In another embodiment, the selected rental vehicle may communicate with the managing server to verify the customer's authentication information.

In case when the customer fails to pass the authentication, the rental vehicle may keep asking for authentication information. In an embodiment, the rental vehicle may not grant an access right after predetermined number of tries for authentication.

In an embodiment, the customer may be able to communicate with an operator to manually authenticate the customer's information just in case when the selected rental vehicle is malfunctioning or has damages to the keypad, scanner, or camera.

After usage of the selected rental vehicle, the customer may return the rental vehicle at the same place as the delivery location or other places. Returning process may be performed depending on the type of the selected rental vehicle. In case of an autonomous rental vehicles, the managing server may control the autonomous rental vehicle to drive to the parking station or one of robot vehicles. In case of manually driven rental vehicles, the managing server control a robot vehicle, which is close to the rental vehicle, to pick up and deliver to the parking station or to load into a compartment of the robot vehicle. The managing server may further charge additional cost if the rental vehicle is used more than the identified usage duration or has been damaged during the usage.

In some embodiment, after the customer returns the rental vehicles, the managing sever may control the selected vehicle to travel to the parking station or an autonomous robot vehicle, find a temporary, legal parking space, drive around in a local area, travel to another customer, travel to another neighborhood with higher demand, or find a charging/gas station. The optimization module of the managing server may determine the best course of action. One optimization function may be revenue or profit maximization given all of the constraints.

Figure 5B:
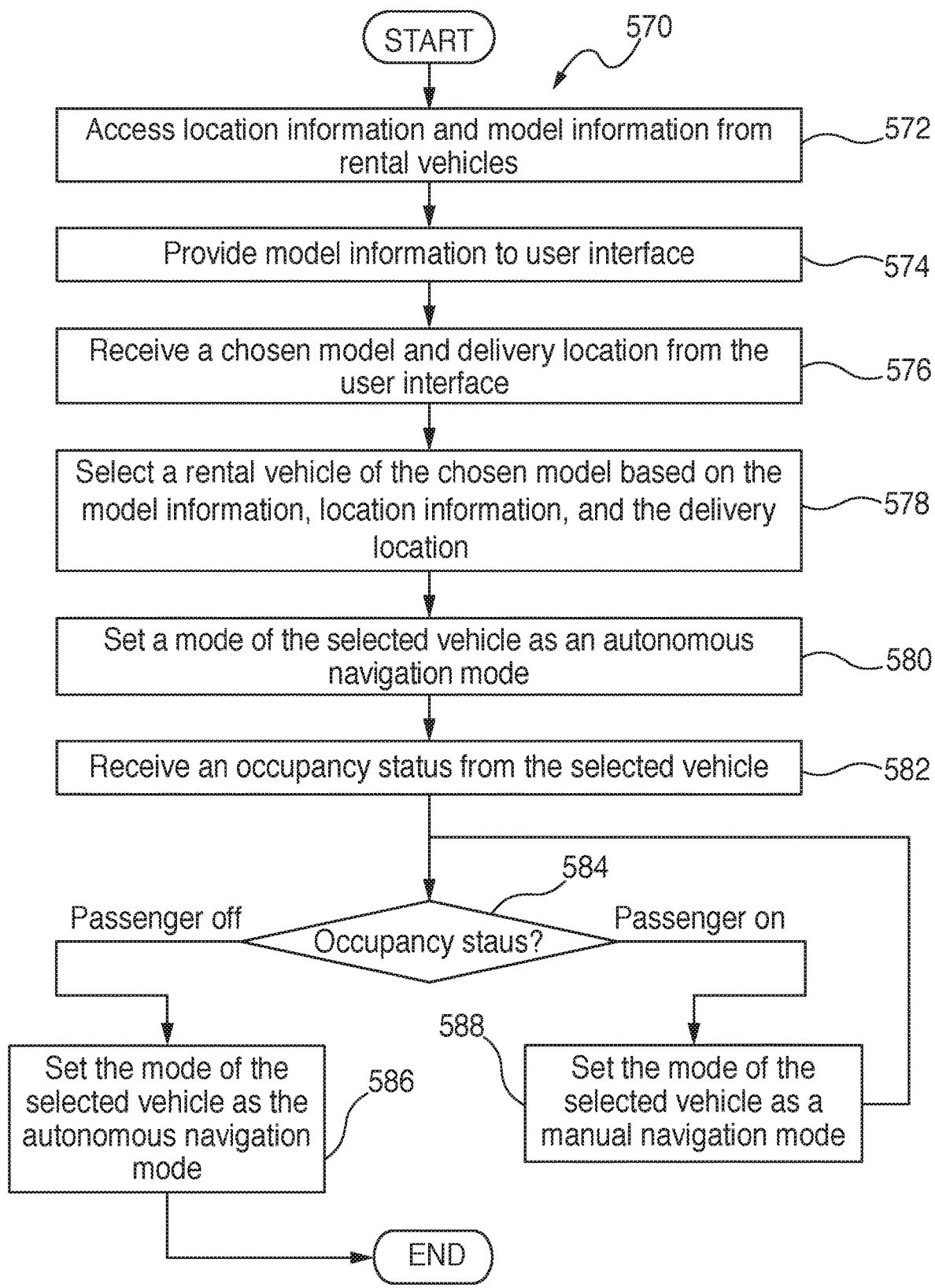
FIG. 5B is a flowchart illustrating another method for delivering rental vehicles in accordance with embodiments of the present disclosure.

Now referring to FIG. 5B, a flowchart is shown illustrating a method 570 for delivering rental vehicles, which are autonomous vehicles, to delivery locations in accordance with embodiments of the present disclosure. The method 570 starts with step 572, in which location information and model information of a plurality of rental vehicles are accessed. Steps 574, 576, and 578 are substantially similar to steps 510, 515, and 520, respectively, and thus descriptions thereof are referred to those of steps 510, 515, and 520 in the above.

The managing server then sets a mode of the selected vehicle as an autonomous navigation mode so that the selected vehicle autonomously travels to the delivery location in step 580. In this regard, the selected vehicle intermittently sends an occupancy status indicating whether or not a driver/customer is in the selected vehicle or able to access the selected vehicle.

After the driver obtains an access right to the selected vehicle, the managing server receives the occupancy status from the selected vehicle in step 582. In a case when the occupancy status indicates that the driver is in the selected vehicle in step 584, the managing server sets the mode of the selected vehicle to a manual operation mode in step 588, so that the driver can manually drive the selected vehicle. In an embodiment, the driver may override the mode from the manual operation mode to the autonomous navigation mode and instruct the selected vehicle to autonomously drive to a destination identified by the driver.

As long as the driver is in the selected vehicle or has the access right to the selected vehicle, the occupancy status can indicate that the driver is on and the driver can manually drive the selected vehicle.

In a case when the occupancy status indicates that no driver is in the selected vehicle in step 584, the managing server then switches the mode of the selected vehicle from the manual operation mode to the autonomous navigation mode in step 586. Then, the selected vehicle is autonomously delivered to a parking lot, which may be a temporary parking space near the current location of the selected vehicle or a parking space dedicated to the selected vehicle. In this way, the driver may be able to manually drive a rental vehicle, while the rental vehicle is autonomously delivered to and from the driver.

Figure 6:
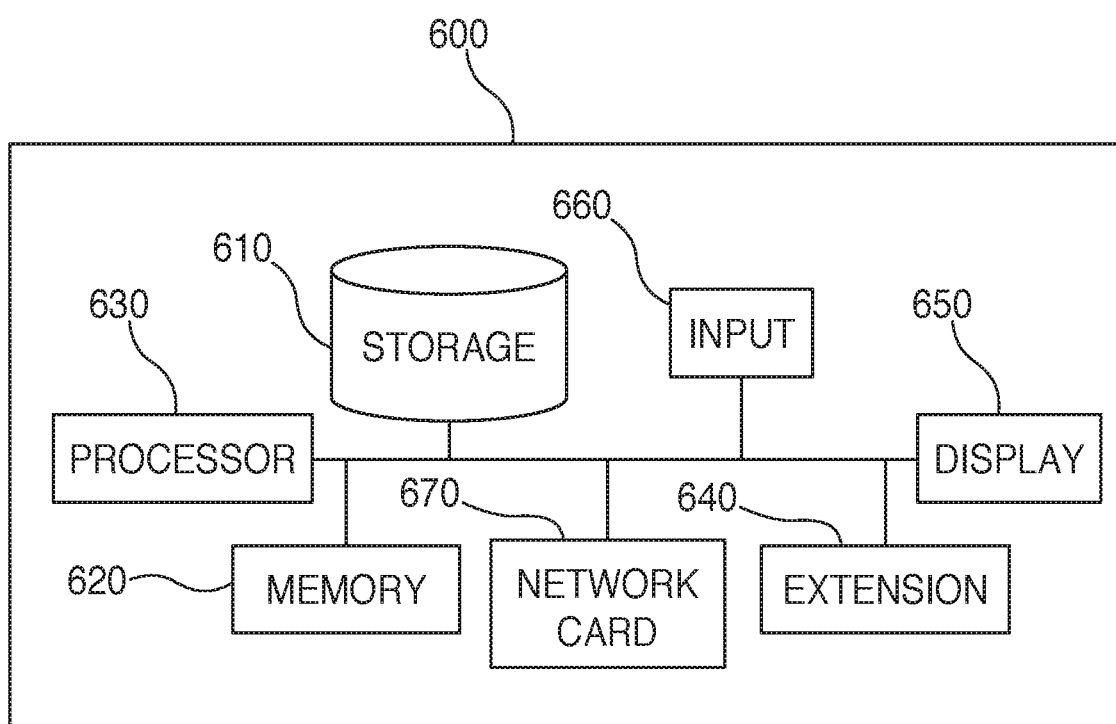
FIG. 6 is a block diagram for the managing server or controller of the robot fleet of FIG. 1 or the mobile device of FIG. 3 in accordance with embodiments of the present disclosure.

FIG. 6 is a block diagram for a computing device 600 representative of the managing server or controller of the robot fleet of FIG. 1 or the mobile device of FIG. 3 in accordance with embodiments of the present disclosure. Further, the computing device 600 may be for a controller of the rental vehicle. The computing device 600 may include a storage 610, memory 620, processor 630, extension 640, display device 650, input device 660, and network card 670. The storage 610 stores data to be accessed for reading and editing and programs to be executed. The memory 620 may include a random access memory (RAM) and a read-only memory (ROM). The ROM generally stores booting programs that run when the computing device is turned on and the RAM is used for fast performance, i.e., loading a program and/or calculating data.

The processor 630 is a brain to the computing device. The processor 630 executes instructions which implement tasks or functions of programs. When a user executes a program, the processor 630 reads the program stored in the storage 610, loads the program on the RAM, and executes instructions prescribed by the program.

A user may input and/or modify data via the input device 660 that may include a keyboard, a mouse, or any other device with which the use may input data. The display device 650 displays data on a screen of the display device 650. The display device 650 may be a touch screen so that the display device 650 can be used as an input device.

The extension 640 may include several ports, such as one or more universal serial buses (USBs), IEEE 1394 ports, parallel ports, and/or expansion slots such as peripheral component interconnect (PCI) and PCI express (PCIe). The extension 640 is not limited to the list but may include other slots or ports that can be used for appropriate purposes. The extension 640 may be used to install hardware or add additional functionalities to a computer that may facilitate the purposes of the computer. For example, a USB port can be used for adding additional storage to the computer and/or an IEEE 1394 may be used for receiving moving/still image data.

The network card 670 is used to communicate with the robot vehicles, rental vehicles, or mobile devices, wirelessly or via a wired connection. Through the network card 670, the robot vehicles, rental vehicles, or mobile devices may receive, modify, and/or update from and to the managing server.

The embodiments disclosed herein are examples of the disclosure and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

The phrases "in an embodiment," "in embodiments," "in various embodiments," "in some embodiments," or "in other embodiments" may each refer to one or more of the same or different embodiments in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

Any of the herein described methods, programs, algorithms or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, C #, Delphi, Fortran, Java, JavaScript, machine code, operating system command languages, Pascal, Perl, PL1, scripting languages, Visual Basic, meta-languages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

The systems described herein may also utilize one or more controllers to receive various information and transform the received information to generate an output. The controller may include any type of computing device, computational circuit, or any type of processor or processing circuit capable of executing a series of instructions that are stored in a memory. The controller may include multiple processors and/or multicore central processing units (CPUs) and may include any type of processor, such as a microprocessor, digital signal processor, microcontroller, programmable logic device (PLD), field programmable gate array (FPGA), or the like. The controller may also include a memory to store data and/or instructions that, when executed by the one or more processors, causes the one or more processors to perform one or more methods and/or algorithms.

Any of the herein described methods, programs, algorithms or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, scripting languages, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

It should be understood that the foregoing description is only illustrative of the present disclosure. Various alternatives and modifications can be devised by those skilled in the art without departing from the disclosure. Accordingly, the present disclosure is intended to embrace all such alternatives, modifications and variances. The embodiments described with reference to the attached drawing figures are presented only to demonstrate certain examples of the disclosure. Other elements, steps, methods, and techniques that are insubstantially different from those described above and/or in the appended claims are also intended to be within the scope of the disclosure.

What is claimed is:

1. A method comprising:
    accessing model information and location information for a plurality of transportation devices, wherein the plurality of transportation device include autonomous transportation devices and non-autonomous transportation devices;
    receiving a request including a delivery location and a chosen model for renting;
    selecting a transportation device of the chosen model from among the plurality of transportation devices based on the model information, the location information, and the delivery location;
    determining whether the selected transportation device is an autonomous transportation device or a non-autonomous transportation device; and
    based on determining that the selected transportation device is an autonomous transportation device:
        instructing the selected transportation device to fully-autonomously or semi-autonomously travel to the delivery location;
        instructing the selected transportation device to switch to a manual operation mode at the delivery location for manual operation by a rental customer; and
        instructing the selected transportation device to switch to a fully-autonomous or a semi-autonomous navigation mode in response to obtaining a rental completion indication.

2. The method of claim 1, further comprising receiving an occupied status from the selected transportation device indicating that a human driver has occupied the selected transportation device.

3. The method of claim 2, wherein instructing the selected transportation device to switch to the manual operation mode includes instructing the selected transportation device to switch to the manual operation mode in response to the occupied status.

4. The method of claim 1, further comprising:
    authenticating the rental customer to access the selected transportation device.

5. The method of claim 1, wherein based on determining that the selected transportation device is a non-autonomous transportation device, the method further comprising:
    determining whether the selected transportation device is secured within a parking station or is secured within one or more robot devices.

6. The method of claim 5, wherein based on determining that the selected transportation device is secured within the parking station, the method further comprising:
    selecting, based on the location information, a robot device to obtain the selected transportation device within the parking station; and controlling the selected robot device to obtain the selected transportation device within the parking station and to deliver the selected transportation device to the delivery location.

7. The method of claim 6, further comprising:
authenticating the rental customer to access the selected transportation device.

8. The method of claim 5, wherein based on determining that the selected transportation device is secured within one or more robot devices, the method further comprising:
selecting, based on the location information, a robot device of the one or more robot devices; and
controlling the selected robot device to deliver the selected transportation device to the delivery location.

9. The method of claim 8, further comprising:
authenticating the rental customer to access the selected transportation device.

10. An apparatus comprising:
a memory storing instructions; and
a processor configured to execute the instructions to cause the apparatus to:
  access model information and location information for a plurality of transportation devices, wherein the plurality of transportation device include autonomous transportation devices and non-autonomous transportation devices;
  receive a request including a delivery location and a chosen model for renting;
  select a transportation device of the chosen model from among the plurality of transportation devices based on the model information, the location information, and the delivery location;
  determine whether the selected transportation device is an autonomous transportation device or a non-autonomous transportation device; and
  based on determining that the selected transportation device is an autonomous transportation device:
    instruct the selected transportation device to fully-autonomously or semi-autonomously travel to the delivery location;
    instruct the selected transportation device to switch to a manual operation mode at the delivery location for manual operation by a rental customer; and
    instruct the selected transportation device to switch to a fully-autonomous or a semi-autonomous navigation mode in response to obtaining a rental completion indication.

11. The apparatus of claim 10, wherein the processor executes the instructions to further cause the apparatus to:
receive an occupied status from the selected transportation device indicating that a human driver has occupied the selected transportation device, wherein instructing the selected transportation device to switch to the manual operation mode includes instructing the selected transportation device to switch to the manual operation mode in response to the occupied status.

12. The apparatus of claim 10, wherein the processor executes the instructions to further cause the apparatus to:
authenticate the rental customer to access the selected transportation device.

13. The apparatus of claim 10, wherein based on determining that the selected transportation device is a non-autonomous transportation device, the processor executes the instructions to further cause the apparatus to:
determine whether the selected transportation device is secured within a parking station or is secured within one or more robot devices.

14. The apparatus of claim 13, wherein based on determining that the selected transportation device is secured within the parking station, the processor executes the instructions to further cause the apparatus to:
select, based on the location information, a robot device to obtain the selected transportation device within the parking station; and
control the selected robot device to obtain the selected transportation device within the parking station and to deliver the selected transportation device to the delivery location.

15. The apparatus of claim 13, wherein based on determining that the selected transportation device is secured within one or more robot devices, the processor executes the instructions to further cause the apparatus to:
select, based on the location information, a robot device of the one or more robot devices; and
control the selected robot device to deliver the selected transportation device to the delivery location.

16. One or more non-transitory computer storage media including instructions stored thereon that, when executed by a processor, cause the processor to perform operations, comprising:
accessing model information and location information for a plurality of transportation devices, wherein the plurality of transportation device include autonomous transportation devices and non-autonomous transportation devices;
receiving a request including a delivery location and a chosen model for renting;
selecting a transportation device of the chosen model from among the plurality of transportation devices based on the model information, the location information, and the delivery location;
determining whether the selected transportation device is an autonomous transportation device or a non-autonomous transportation device; and
based on determining that the selected transportation device is an autonomous transportation device:
  instructing the selected transportation device to fully-autonomously or semi-autonomously travel to the delivery location;
  instructing the selected transportation device to switch to a manual operation mode at the delivery location for manual operation by a rental customer; and
  instructing the selected transportation device to switch to a fully-autonomous or a semi-autonomous navigation mode in response to obtaining a rental completion indication.

17. The non-transitory computer storage media of claim 16, further comprising receiving an occupied status from the selected transportation device indicating that a human driver has occupied the selected transportation device, wherein instructing the selected transportation device to switch to the manual operation mode includes instructing the selected transportation device to switch to the manual operation mode in response to the occupied status.

18. The non-transitory computer storage media of claim 16, wherein based on determining that the selected transportation device is a non-autonomous transportation device, the processor performs further operations, comprising:
determining whether the selected transportation device is secured within a parking station or is secured within one or more robot devices.

19. The non-transitory computer storage media of claim 18, wherein based on determining that the selected transportation device is secured within the parking station, the processor performs further operations, comprising:
- selecting, based on the location information, a robot device to obtain the selected transportation device within the parking station; and
- controlling the selected robot device to obtain the selected transportation device within the parking station and to deliver the selected transportation device to the delivery location.

20. The non-transitory computer storage media of claim 18, wherein based on determining that the selected transportation device is secured within one or more robot devices, the processor performs further operations, comprising:
- selecting, based on the location information, a robot device of the one or more robot devices; and
- controlling the selected robot device to deliver the selected transportation device to the delivery location.

* * * * *